United States Patent
Li et al.

(10) Patent No.: US 7,752,611 B2
(45) Date of Patent: Jul. 6, 2010

(54) SPECULATIVE CODE MOTION FOR MEMORY LATENCY HIDING

(75) Inventors: Long Li, Shanghai (CN); Jinquan Dai, Shanghai (CN); Zhiyuan Lv, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 10/582,519

(22) PCT Filed: Dec. 10, 2005

(86) PCT No.: PCT/CN2005/002150

§ 371 (c)(1),
(2), (4) Date: Jun. 9, 2006

(87) PCT Pub. No.: WO2007/065308

PCT Pub. Date: Jun. 14, 2007

(65) Prior Publication Data

US 2009/0037889 A1     Feb. 5, 2009

(51) Int. Cl.
*G06F 9/45* (2006.01)
(52) U.S. Cl. .................. 717/151; 717/152; 717/153; 717/159; 717/161
(58) Field of Classification Search ............... 717/151, 717/152, 153, 159, 161
See application file for complete search history.

(56) References Cited

U.S. PATENT DOCUMENTS

2005/0108695 A1    5/2005    Li et al.

FOREIGN PATENT DOCUMENTS

CN              1296624 A       5/2001

OTHER PUBLICATIONS

Chang, et al. "Impact: An Architecture Framework for Multiple-Instruction-Issue Processors", 1991, ACM, p. 266-275.*
PCT, International Search Report and Written Opinion of the International Searching Authority, Aplication No. PCT/CN2005/002150, mailed Sep. 21, 2006, p. 1-9.

* cited by examiner

*Primary Examiner*—Wei Y Zhen
*Assistant Examiner*—Qamrun Nahar
(74) *Attorney, Agent, or Firm*—Blakely, Sokoloff, Taylor & Zafman LLP

(57) ABSTRACT

Various embodiments that may be used in performing speculative code motion for memory latency hiding are disclosed. One embodiment comprises extracting an asynchronous signal from a memory access instruction in a program to represent a latency of the memory access instruction, and generating a wait instruction to wait the asynchronous signal.

25 Claims, 7 Drawing Sheets

[R2]=store R1  ← 412
R3=R2+1
... ...
R4=R3<<2
R1=R5-R4
↳ 400
FIG. 4A
[R2]=store R1, signal s ← 422
Wait s ← 424
R3=R2+1
... ...
R4=R3<<2  } ← 426
R1=R5-R4
FIG. 4B
[R2]=store R1, signal s
↓
Wait s
↓
R1=R5-R4  ← 436
FIG. 4C
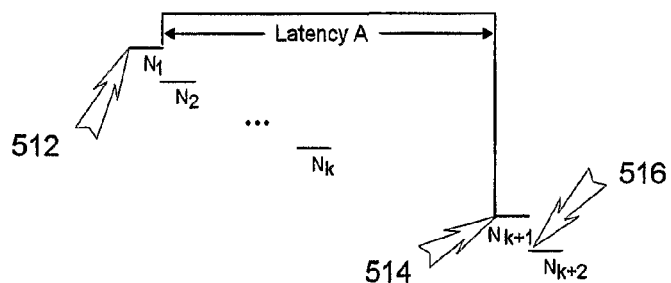
FIG. 5A
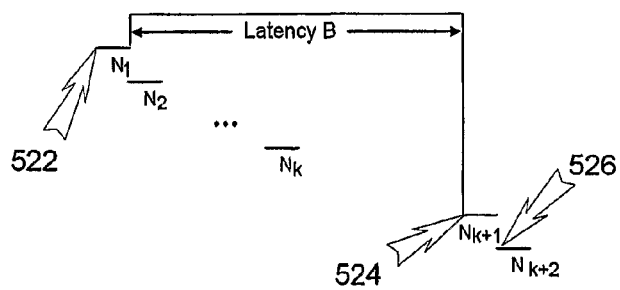
FIG. 5B

SPECULATIVE CODE MOTION FOR MEMORY LATENCY HIDING

CROSS-REFERENCE TO RELATED APPLICATION

This application is a National Phase application of, and claims priority to, International Application No. PCT/CN2005/002150, filed Dec. 10, 2005, entitled "SPECULATIVE CODE MOTION FOR MEMORY LATENCY HIDING".

BACKGROUND

Network processors (NP) may be used for packet processing. However, the latency for one external memory access in network processors may be larger than the worst-case service time. Therefore, network processors may have a parallel multiprocessor architecture, and perform asynchronous (non-blocking) memory access operations, so that the latency of memory accesses can be overlapped with computation work in other threads. For instance, an example of network processors may process packets in its Microengine cluster, which consists of multiple Microengines (programmable processors with packet processing capability) running in parallel. Every memory access instruction may be non-blocking and associated with an event signal. That is, in response to a memory access instruction, other instructions following the memory access instruction may continue to run during the memory access. The other instructions may be blocked by a wait instruction for the associated event signal. When the associated event signal is asserted, the wait instruction may clear the event signal and return to execution. Consequently, all the instructions between the memory access instruction and the wait instruction may be overlapped with the latency of the memory access.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIGS. 4A-4C each illustrates an embodiment of a representation of a program that comprise a memory access instruction.

FIGS. 5A and 5B are time sequence diagrams that each illustrates an embodiment of a latency of a memory access instruction.

DETAILED DESCRIPTION

The following description describes techniques to hide memory access latency. The implementation of the techniques is not restricted in network processors; it may be used by any execution environments for similar purposes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
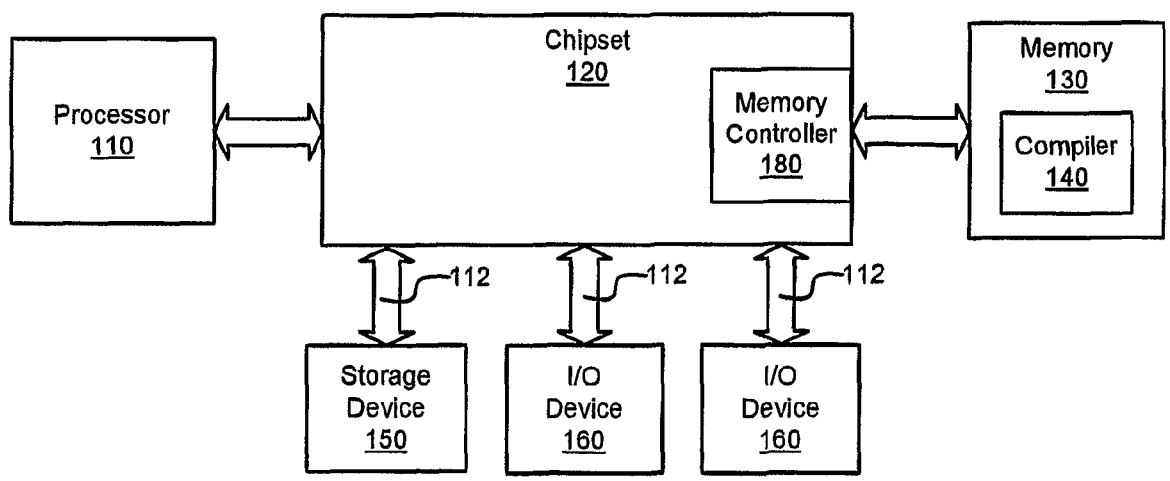
FIG. 1 illustrates an embodiment of a computing device.

An example embodiment of a computing device 100 is shown in FIG. 1. The computing device 100 may comprise one or more processors 110 coupled to a chipset 120. The chipset 120 may comprise one or more integrated circuit packages or chips that couple the processor 110 to system memory 130, storage device 150, and one or more I/O devices 160 such as, for example, mouse, keyboard, video controller, etc. of the computing device 100.

Each processor 110 may be implemented as a single integrated circuit, multiple integrated circuits, or hardware with software routines (e.g., binary translation routines). The processor 110 may perform actions in response to executing instructions. For example, the processor 110 may executes programs, performs data manipulations and control tasks in the computing device 100. The processor 110 may be any type of processor adapted to execute instructions from memory 130, such as a microprocessor, a digital signal processor, a microcontroller, or another processor.

The memory 130 may comprise one or more different types of memory devices such as, for example, dynamic random access memory (DRAM) devices, static random access memory (SRAM) devices, read-only memory (ROM) devices, and/or other volatile or non-volatile memory devices. The memory 120 may store instructions and codes represented by data signals that may be executed by processor 110. In one embodiment, a compiler 140 may be stored in the memory 120 and implemented by the processor 110. The compiler 140 may comprise any type of compiler adapted to generate data, code, information, etc., that may be stored in memory 130 and accessed by processor 110.

The chipset 120 may comprise a memory controller 180 that may control access to the memory 130. The chipset 120 may further comprise a storage device interface (not shown) that may access the storage device 150. The storage device 150 may comprise a tape, a hard disk drive, a floppy diskette, a compact disk (CD) ROM, a flash memory device, other mass storage devices, or any other magnetic or optic storage media. The storage device 150 may store information, such as code, programs, files, data, applications, and operating systems. The chipset 120 may further comprise one or more I/O interfaces (not shown) to access the I/O device 160 via buses 112 such as, for example, peripheral component interconnect (PCI) buses, accelerated graphics port (AGP) buses, universal serial bus (USB) buses, low pin count (LPC) buses, and/or other I/O buses.

The I/O device 160 may include any I/O devices to perform I/O functions. Examples of the I/O device 160 may include controller for input devices (e.g., keyboard, mouse, trackball, pointing device), media card (e.g., audio, video, graphics), network card, and any other peripheral controllers.

Figure 2:
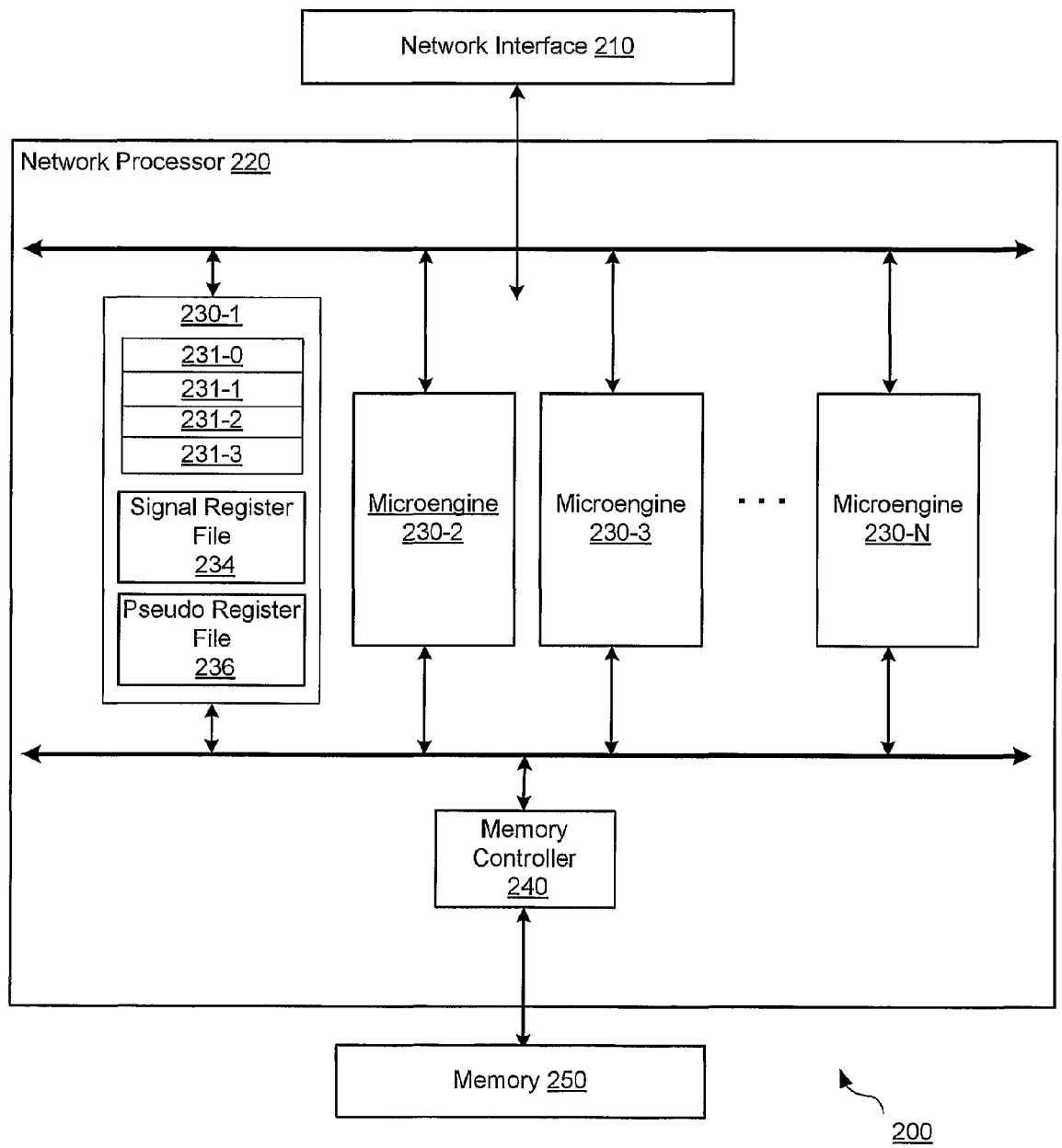
FIG. 2 illustrates an embodiment of a network device.

An embodiment of a network device 200 is shown in FIG. 2. The network device 200 may enable transfer of packets between a client and a server via a network. The network device 200 may comprise a network interface 210, a network processor 220, and a memory 250. The network interface 210 may provide physical, electrical, and protocol interfaces to transfer packets. For example, the network interface 210 may receive a packet and send the packet to the network processor 220 for further processing.

The memory 250 may store one or more packets and packet related information that may be used by the network processor 220 to process the packets. In one embodiment, the memory 250 may store packets, look-up tables, data structures that enable the network processor 220 to process the packets. In one embodiment, the memory 250 may comprise a dynamic random access memory (DRAM) and a static random access memory (SRAM).

The network processor 220 may receive one or more packets from the network interface 210, process the packets, and send the packets to the network interface 210. In one embodiment, the network processor 220 may comprise a network processor, for example, Intel® IXP2400 network processor. The network processor 220 may comprise a memory controller 240 that may control access to memory 250. For example, the network processor 220 may perform asynchronous or non-blocking memory access operations on memory 250 under control of the memory controller 240. In one embodiment, the memory controller 240 may be located outside the network processor 220.

The network processor 220 may further comprise microengines 230-1 through 230-N that may run in parallel. The microengine 230-1 through 230-N may cooperatively operate to process the packets. Each microengine may process a portion of the packet processing task. The processing of a packet may comprise sub-tasks such as packet validation, IP lookup, determining the type of service (TOS), time to live (TTL), out going address and the MAC address. In one embodiment, each microengine may comprise one or more threads and each thread may perform a sub-task. For example, the microengine 230-1 may comprise threads such as 231-0 to 231-3. However, other embodiments may comprise a different number of threads such as, for example, eight threads. Each microengine may comprise a signal register file and a pseudo register file. For example, the microengine 230-1 may comprise a signal register file 234 and a pseudo register file 236. The signal register file 234 may comprise one or more registers that each may store an asynchronous signal corresponding to a memory access instruction. The pseudo register file 236 may comprise one or more registers that each may store a pseudo signal.

Figure 3:
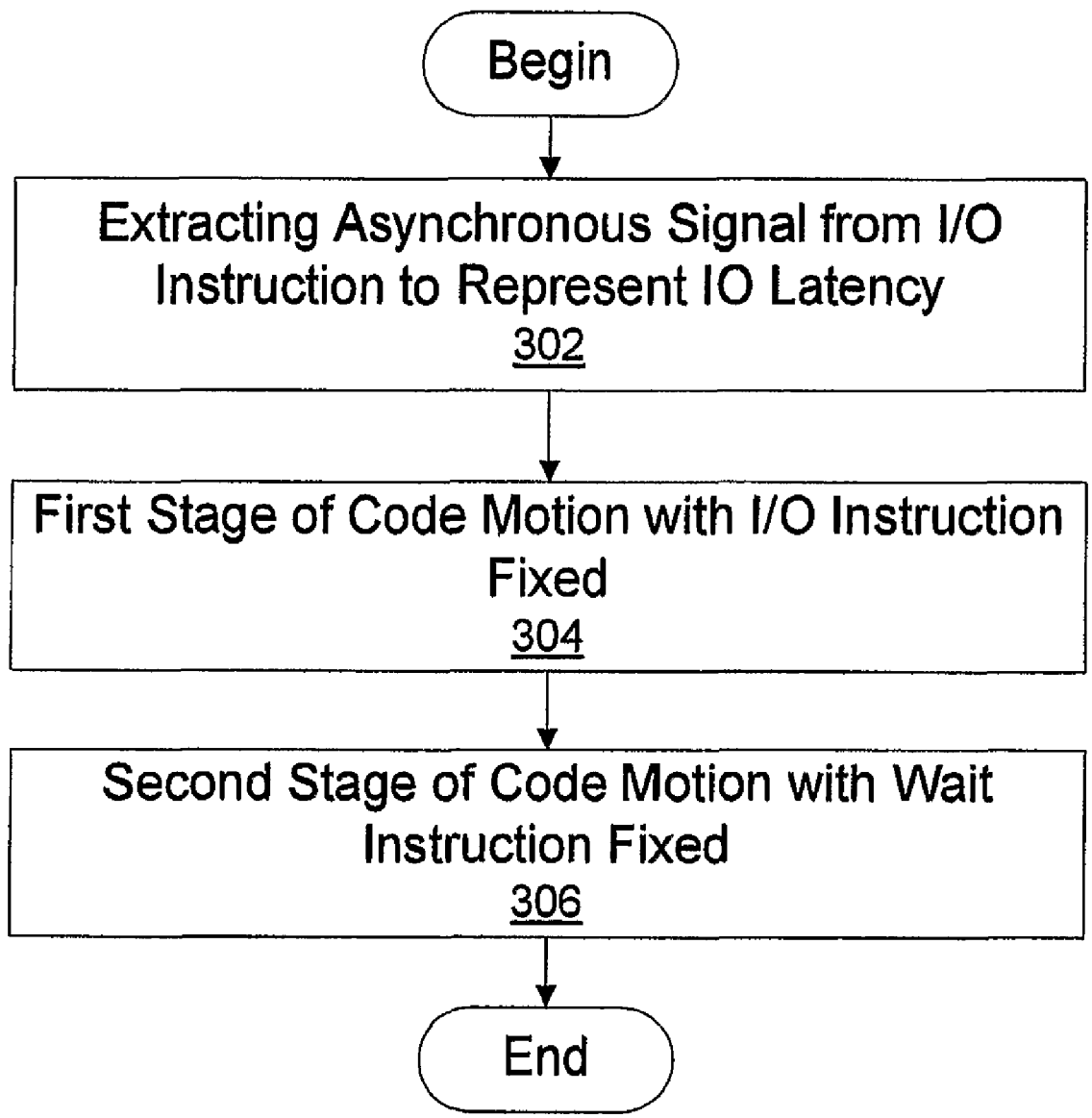
FIG. 3 illustrates an embodiment of a method that may be used for memory latency hiding.

In the following, an example embodiment of a process as shown in FIG. 3 will be described in combination with FIGS. 4-7. In block 302, the compiler 140 may extract from an I/O instruction or memory access instruction an asynchronous signal that may represent latency associated with the I/O instruction. In one embodiment, the I/O instruction or memory access instruction may comprise a store instruction, a load instruction, etc. For a program 400 as shown in FIG. 4A, the compiler 140 may extract an asynchronous signal s from a store instruction 412. After the extraction, the compiler 140 may represent the store instruction 412 as a store instruction 422 (FIG. 4B) associated with the asynchronous signal s. The compiler 140 may further generate a wait instruction 424 that wait the asynchronous signal s. In one embodiment, the signal register file 234 may comprise a signal register to store the asynchronous signal s. As shown in FIG. 4C, the asynchronous signal s may represent a dependence or dependence constraint, for example, between the store instruction 422 and the wait instruction 424 explicitly in the compiler 140, so that optimization of the latency, as well as other optimizations, may continue to work on the dependence of the program 400.

Figure 6A:
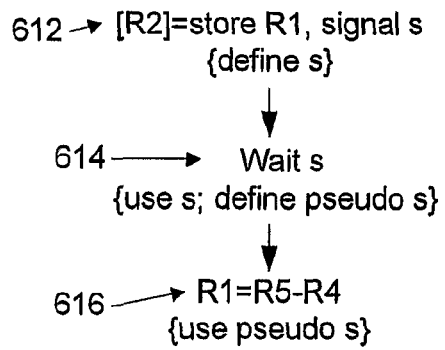
FIGS. 6A and 6B each illustrates an embodiment of a representation of a compiler to enforce the dependence for a memory access instruction.
Figure 6B:
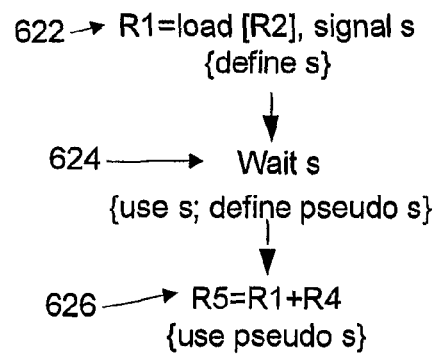

In order to enforce the dependence between a memory access instruction and a wait instruction, the compiler 140 may use a relationship of define and use. For example, referring to an internal representation of the compiler 140 as shown in FIG. 6A, the compiler 140 may make a store instruction 612 define an asynchronous signal extracted from the store instruction 612. The compiler 140 may further make a wait instruction 614 wait for or use the asynchronous signal. Similarly, as shown in FIG. 6B, the compiler 140 may make a load instruction 622 define an asynchronous signal extracted from the load instruction 622 and may make a wait instruction 624 wait for or use the asynchronous signal. In one embodiment, a signal register to store the asynchronous signal may be introduced in a network device, for example, as shown in FIG. 2. For example, the signal register file 234 of FIG. 2 may comprise one or more signal registers that may each store an asynchronous signal extracted from a memory access instruction.

Referring to FIGS. 5A and 5B, embodiments of instructions that may have dependence on associated wait instructions are illustrated. As shown in FIG. 5A, after issue of a load instruction, R1=load [R2], signal s (512), an instruction, R2=R1+1, that uses a result R1 of the load instruction has to wait for the completion of the load operation (516), i.e., after the asynchronous signal of the load instruction is asserted and the result R1 is ready (514). The instruction may not be overlapped with latency A of the load instruction. Similarly, FIG. 5B illustrates a similar situation for an instruction, R2=R3+1, that overwrites a source R2 of a store instruction, [R1]=store R2, signal.

In order to enforce a dependence of an instruction that depends on the completion of a memory access instruction and a wait instruction associated with the memory access instruction, the compiler 140 may also employ a relationship of define and use. In one embodiment, the compiler 140 may introduce a pseudo signal register for each signal register for a memory access instruction. Referring to the internal representation as shown in FIG. 6A, the compiler 140 may make the wait instruction 614 define a pseudo signal corresponding to the asynchronous signal extracted from the store instruction 612. The compiler 140 may further make an instruction 616 that depends on the completion of the store instruction 612 use the pseudo signal. Similarly, FIG. 6B illustrates another embodiment relating to a load instruction. In one embodiment, the pseudo register file 236 of FIG. 2 may comprise one or more pseudo signal registers that may each store a pseudo signal.

In one embodiment, the compiler 140 may map a register number to a signal register and a pseudo register. An example of the codes may be as follows, wherein V2SP may represent the corresponding signal register and pseudo register:

Map of int to pair: V2 SP

In another embodiment, the compiler 140 may use the following codes to express the define-use relation as DU and organize the define-use relation DU as webs, wherein R is the number of register accesses:

Relation of R to R: DU;
PartitionSet of R: webs;

The following codes may be used by the compiler 140 to extract asynchronous signals and introduce pseudo signals to enforce the dependence for load instructions in a program. For example, the compiler 140 may execute the following operation:

Build def-use relation for the registers defined in all load instructions in the program Then, the compiler 140 may construct webs based on DU relation, wherein r1 and r2 may represent a pair of two factors in DU, i.e., define and use. For example:

For each pair <r1,r2> in DU Join r1 and r2 in webs;

In one embodiment, for each partition w in the webs, the compiler 140 may further map a register number v to a pair of signal s and pseudo p to obtain s and p from the corresponding signal register and pseudo register V2SP[v]. For each factor r in each partition w, the compiler 140 may further determine whether the register number v is defined in an instruction i. If yes, the compiler 140 may further make the instruction i define s explicitly. If not, the compiler 140 may generate a wait instruction to wait for signal s and make the wait instruction define p and use s explicitly, in response to determining that the instruction i is a load instruction. The compiler 140 may further make the instruction i use p explicitly, in response to determining that v is used in the instruction i. An example of the corresponding codes may be as follows:

```
For each partition w in the webs
{
    /*w's register number is v*/
    <s,p>=V2SP[v];   /*map v to signal s and pseudo p*/
    for each occurrence r of w
    {
        /*i is the container instruction*/
        if(v is defined here)
        {
            Make i define s explicitly ;
            if (i is a load instruction )
                Generate an instruction to wait signal s
        and make the wait instruction define p and use s
        explicitly;
        }else/*v is used here*/
        {
            Make i use p explicitly;
        }
    }
}
```

Similarly, an example algorithm is shown as follows for the compiler 140 to extract asynchronous signals and introduce pseudo signals to enforce the dependence for store instructions, wherein the compiler 140 may use use-define relation UD.

```
Build use-define relation for the registers used in all
    store instructions in the program ;
/*Construct webs based on UD relation*/
For each pair<r1,r2 > in UD
    Join r1 and r2 in webs;
For each partition w in the webs
{
    /* w's register number is v*/
    <s, p>=V2SP[v]; /*map v to signal s and pseudo p*/
    for each occurrence r of w
    {
        /*i is the container instruction*/
        if (v is used here)
        {
            Make i define s explicitly ;
            if(i is a store instruction)
                Generate an instruction to wait signal s
        and make the wait instruction define p and use s
        explicitly;
        }else /*v is defined here*/
        {
            Make i use p explicitly ;
        }
    }
}
```

In order to schedule as many instructions as possible between issue of a memory access operation and its completion, the compiler 140 may perform code motion subject to the dependence constraint or order/relationship of instructions defined in a program. In block 304, the compiler 140 may further perform a first stage of code motion. For example, the compiler 140 may recognize a first set of one or more instructions in a program except I/O instructions as motion candidates and move the candidates forward subject to the dependence constraint of the program through one or more paths in the flow graph of the program. In one embodiment, the first stage of code motion may comprise a code sinking operation. For example, for the program as shown in FIG. 4B, the compiler 140 may recognize instructions 426 and the wait instruction 424 as motion candidates and may move these instructions forward while fixing the location of memory access instruction 422, so that a number of instructions between the issue and the completion of the memory access instruction 422 may be increased subject to a dependence constraint in the program.

Figure 7A:
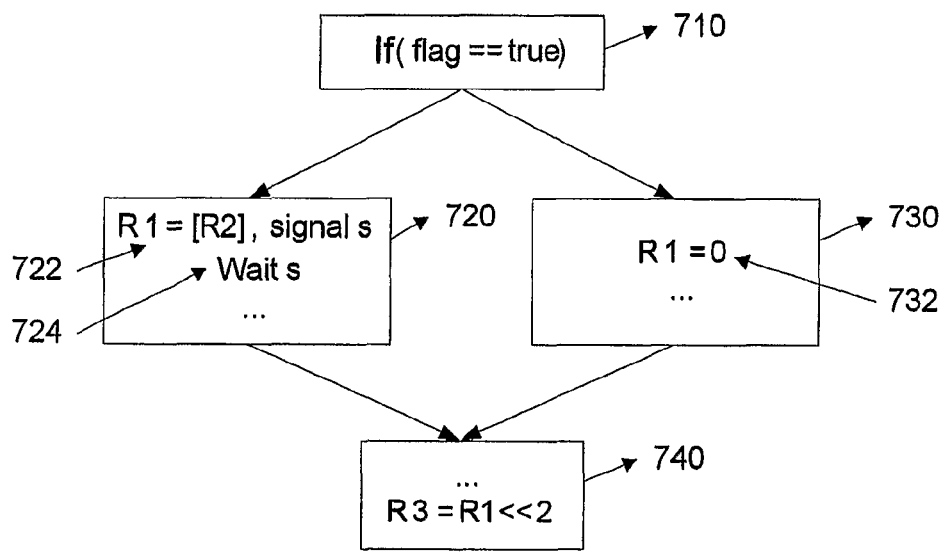
FIGS. 7A-7C illustrate an embodiment of a speculative code motion for a wait instruction.

In one embodiment, in the first stage of code motion, compiler 140 may further adopt speculative code motion for wait instructions, for example, in a situation as shown in FIG. 7A. FIG. 7A illustrates an embodiment of a flow graph, wherein block 710 is a merging predecessor block for blocks 720 and 730 that are two predecessor blocks for block 740; and block 740 is a merging successor block of blocks 720 and 730; however, other embodiments may comprise a different structure. The first predecessor block 720 may comprise a wait instruction 724 associated with a memory access instruction 722. The second predecessor block 730 does not comprise a wait instruction. In this situation, the compiler 140 may not move forward or sink the wait instruction 724 into the merging successor block 740 of the blocks 720 and 730 even if the dependence constraint of the flow graph allows.

Figure 7B:
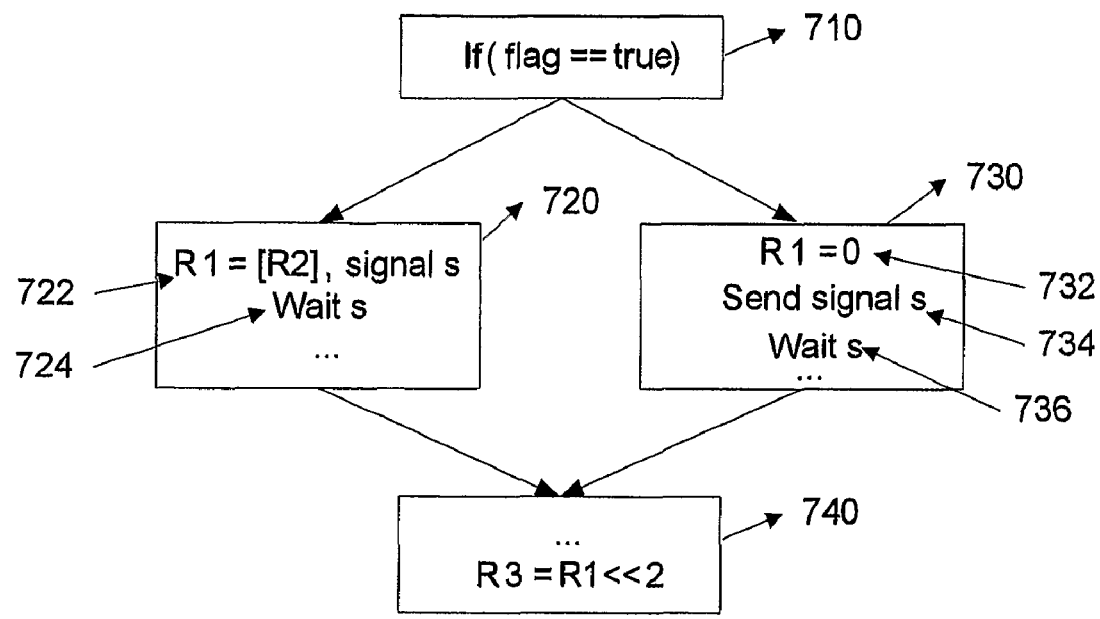
Figure 7C:
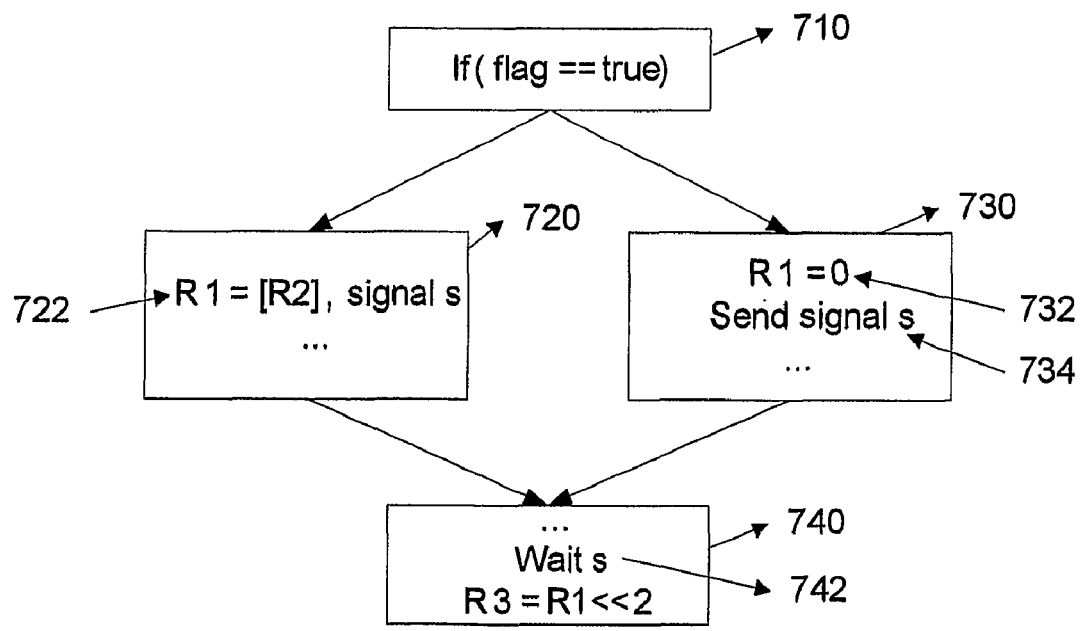

In order to perform the first stage of code motion speculatively, for example, in the situation as shown in FIG. 7A, in one embodiment, the compiler 140 may further insert or append one or more compensation codes to the second predecessor block 730. Referring to FIG. 7B, the compiler 140 may insert a signal sending instruction 734 and a second wait instruction 736 into the second predecessor block 730. The signal sending instruction 734 may send the asynchronous signal of the memory access instruction 722 to the second predecessor block 730 subject to the dependence constraint of the flow graph. The compiler 140 may generate a second wait instruction 736 that waits for the asynchronous signal in block 730. Then, as shown in FIG. 7C, the compiler 140 may remove the two wait instructions 722 and 736 from blocks 720 and 730, respectively. The compiler 140 may further prepend an instruction instance 742 of wait instructions 722 and 736 to the merging successor block 740 while fixing the memory access instruction 722 subject to the dependence constraint of the flow graph, so that a number of instructions between the issue and the completion of the memory access instruction 722 may be increased.

In block 306, the compiler 140 may perform a second stage of code motion. In one embodiment, the compiler 140 may recognize a second set of one or more instructions in the program except wait instructions as motion candidates and move the candidates backward subject to the dependence constraint through the paths in the program. In one embodiment, the second stage of code motion may comprise a code hoisting operation. In another embodiment, for a motion candidate that depends on the completion of a memory access instruction, the compiler 140 may move the candidate backward to follow a wait instruction associated with the memory access instruction so as to accord with the dependence constraint between the candidate and the wait instruction. In one embodiment, the second instruction set may comprise one or more instructions that are comprised in the first instruction set.

In one embodiment, the compiler 140 may perform a code sinking operation with I/O instruction fixed and a code hoisting operation with wait instruction fixed; however, in another embodiment, the compiler 140 may perform in a program, for example, a code hoisting operation with wait instruction fixed and a code sinking operation with I/O instruction fixed subject to dependence constraint of the program.

In the following, a description will be made on an example of codes that may be used by the compiler 140 to perform speculative code motion for wait instructions. In one embodiment, the compiler 140 may use the following codes to map an instruction i in a program to a motion candidate c (NC):

Map of int to int: NC;

The compiler 140 may map two instructions in a program to the same motion candidate NC, in response to determining that the two instructions are syntactically the same.

In another embodiment, the compiler 140 may use the following code to represent a number of occurrence of an instruction in predecessor blocks as SinkCandidates, wherein the instruction is ready to sink into a successor block of the predecessor blocks subject to a dependence constraint:

Vector of int: SinkCandidates;

In one embodiment, the compiler 140 may build a map of motion candidates NC in a program, build a flow graph G for the program, and initialize a work queue Sinkqueue with basic blocks based on a topological order in the flow graph G. For example:

Build the map of NC that maps an instruction i to motion candidate c;
Build the flow graph G for the program;
Initialize a WorkQueue (SinkQueue) with basic blocks based on the topological order in graph G The compiler 140 may determine whether the work queue is empty or not. In response to determining that the work queue comprises at least one basic block, the compiler 140 may dequeue a basic block b from the SinkQueue. The compiler 140 may further build a set for all predecessor blocks of the basic block b as Predecessors. For each predecessor block p, the compiler 140 may put each instruction i in p into a set of Ready, in response to determining that i is ready to sink into the basic block b subject to the dependence constraint of the program.

```
While (SinkQueue is not empty)
{
    Dequeue a basic block b fromSinkQueue;
    Build a set Predecessors for all predecessors of b;
    For each basic blockp inPredecessors
        For each instructioni in basic blockp
            ifi is ready to sink into basic block b subject to
            dependence constraint
                Puti into the set of Ready ;
```

In response to determining that the SinkQueue is not empty, the compiler 140 may further determine whether the set of Ready is empty. In response to determining that Ready comprises at least one instruction, i.e., not empty, the compiler 140 may further reset a number of ready instructions for each motion candidates or predecessor block SinkCandidates. For example:

```
while(Ready is not empty)
{
    /*reset the number of the ready instructions for each motion
    candidate to 0*/
    Reset SinkCandidates;
```

For each instruction i in Ready, the compiler 140 may record or calculate SinkCandidates[NC[i]], i.e., a number of occurrence of the instruction i in different predecessors of the basic block b. For each instruction i in Ready, in response to determining that the number SinkCandidates[NC[i]] is less than the number of predecessor blocks of b, the compiler 140 may further determine whether the current candidate is a wait instruction. In response to determining that the current candidate is a wait instruction, the compiler 140 may append compensation code to the predecessor blocks where the current candidate is not ready, such as a situation shown in FIG. 7A and make SinkCandidates[NC[i]] equal to the number of predecessor blocks of b (FIG. 7B). On the other hand, for each instruction i in Ready, in response to determining that SinkCandidates[NC[i]] equals to the number of predecessor blocks of b, the compiler 140 may remove all instructions corresponding to the current candidate from all predecessor blocks of b and prepend an instruction instance of the candidate to b (FIG. 7C). The compiler 140 may further update the dependence constraint relating to all predecessor blocks and may update the set of Ready. An example of codes may be as follows:

```
For each instructioni in Ready
{
    SinkCandidates [NC[i ]]++;
}
For each instructioni in Ready
```

```
{
  if(SinkCandidates[NC[i ]]< The number of predecessors of b)
  {
    if(The current candidate which NC[i] indicates is a WAIT instrution)
    {
      Append the compensation code to the blocks in
      Predecessors where this candidate is not ready;
      SinkCandidates[NC[ i ]] = The number of predecessors of b;
    }
  }
  if(SinkCandidates[NC[ i ]] == The number of predecessors of b)
  {
    Remove all the instructions corresponding to this candidate
    from all the predecessors of b;
    Prepend an instruction instance of this candidate to basic block b;
    Update the dependence constraint of all predecessor blocks ;
    Update the Ready set ;/* May introduce more ready instructions*/
  }
}
```

In another embodiment, the compiler 140 may further enqueue successor blocks of the current block b of G in SinkQueue, in response to any change when the SinkQueue is not empty. For example:

If any change happens, enqueue the current block's successors in G in SinkQueue

Figure 8:
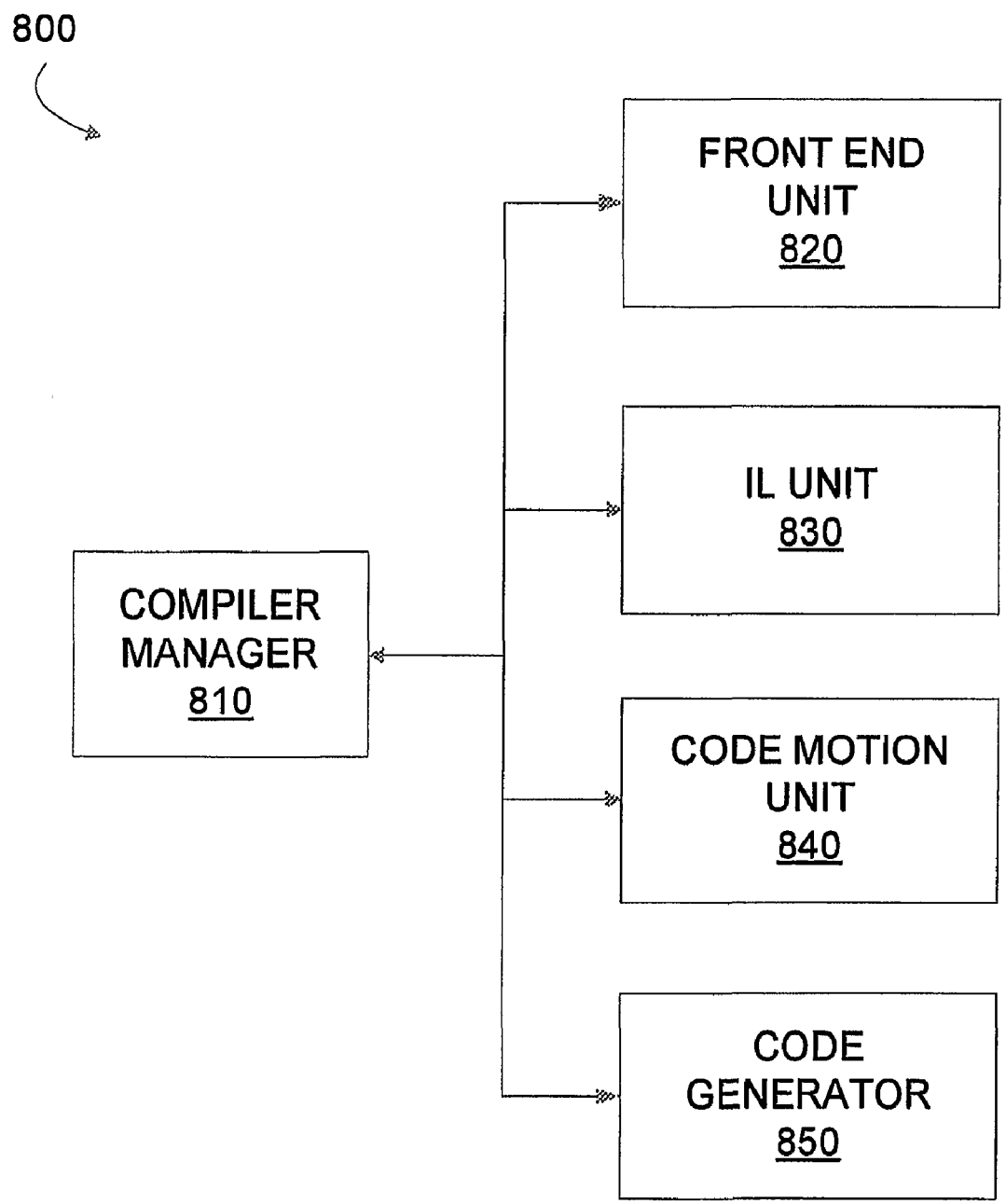
FIG. 8 illustrates an embodiment of a compiler.

FIG. 8 is a block diagram that illustrates a compiler 800 according to an embodiment of the present invention. The compiler 800 may comprise a compiler manager 810. The compiler manager 810 may receives source code to compile. The compiler manager 810 may interface with and transmit information between other components in the compiler 800.

The compiler 800 may comprise a front end unit 820. In one embodiment, the frond end unit 820 may parse source code. An intermediate language unit 830 in the compiler 800 may transforms the parsed source code from the front end unit 820 into one or more common intermediate forms, such as an intermediate representation. For example, referring to FIGS. 6A and 6B, the intermediate language unit 820 may extract an asynchronous signal from a memory access instruction and may define the asynchronous signal in the memory access instruction explicitly. The intermediate language unit 820 may further make a wait instruction associated with the memory access instruction wait for or use the asynchronous signal and may define a pseudo signal associated with the asynchronous signal, with reference to 614 and 624 in FIGS. 6A and 6B. The intermediate language unit 820 may make a memory access dependent instruction, such as 616 and 626 in FIGS. 6A and 6B, use the pseudo signal. In one embodiment, a network device, for example, as shown in FIG. 2, may comprise a signal register and a pseudo register to store the asynchronous signal and the pseudo signal, respectively.

In one embodiment, the compiler 800 may further comprise a code motion unit 840. The code motion unit 840 may perform, for example, global instruction scheduling. In one embodiment, the code motion unit 840 may perform code motion as described in blocks 304 and 306 of FIG. 3. For example, the code motion unit 840 may move an instruction from a predecessor block into a successor block subject to a dependence constraint of a program, for example, as shown in FIG. 7C. In another embodiment, the code motion unit 840 may move an instruction from a successor block into a predecessor block subject to a dependence constraint of a program. In yet another embodiment, the code motion unit 840 may perform speculative code motion for wait instructions subject to a dependence constraint of a program, for example, as shown in FIGS. 7B and 7C. In one embodiment, the compiler 800 may comprise one or more code motion unit 840 that may each perform one code motion, such as, for example, a first code motion, a second code motion and/or a speculative code motion. In another embodiment, the compiler 800 may comprise other code motion units for different code motions.

The compiler 800 may further comprise a code generator 850 that may convert the intermediate representation into machine or assembly code.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A method comprising:
extracting an asynchronous signal from each memory access instruction in a program to represent a latency of the memory access instruction;
generating a wait instruction to wait for each asynchronous signal;
performing a first code motion on a first set of one or more instructions in the program except each memory access instruction in the program subject to a dependence constraint of the program; and
performing a second code motion on a second set of one or more instructions in the program except each wait instruction in the program subject to a dependence constraint of the program, to increase a number of instructions between issue and completion of the memory access instruction, wherein the first code motion and the second code motion are in opposite directions.

2. The method of claim 1, further comprising:
enforcing a first dependence between the memory access instruction and the wait instruction via the asynchronous signal.

3. The method of claim 1, further comprising:
introducing a pseudo signal to enforce a second dependence between the wait instruction and a memory access dependent instruction.

4. The method of claim 3, further comprising:
storing the pseudo signal in a pseudo signal register of a network device.

5. The method of claim 1, further comprising:
making the memory access instruction define the asynchronous signal; and
making the wait instruction use the asynchronous signal.

6. The method of claim 1, further comprising:
making the wait instruction define a pseudo signal; and
making an instruction that depends on the completion of the memory access instruction use the pseudo signal.

7. The method of claim 1, further comprising:
storing the asynchronous signal in a signal register of a network device.

8. A method, comprising subject to a dependence constraint of a program:
performing a first code motion on a first set of one or more instructions in the program except each memory access instruction in the program subject to a dependence constraint of the program, and
performing a second code motion on a second set of one or more instructions in the program except each wait instruction in the program subject to a dependence constraint of the program, to increase a number of instructions between issue and completion of the memory access instruction, wherein the first code motion and the second code motion are in opposite directions.

9. The method of claim 8, wherein the first code motion comprises moving the first instruction set forward through one or more paths of the program with the memory access instructions fixed, and the second code motion comprises moving the second instruction set backward through the one or more paths of the program with the wait instructions fixed.

10. The method of claim 8, wherein the first code motion comprises sinking the one or more instructions in the first set that occur in each predecessor block of a successor block into the successor block, and the second code motion comprises hoisting the one or more instructions in the second set.

11. The method of claim 8, comprising:
performing a speculative code motion on a wait instruction, in response to determining that the wait instruction is absent in at least one predecessor blocks of a successor block.

12. The method of claim 8, comprising:
in response to determining that the number of occurrence of a wait instruction in predecessor blocks of a successor block is less than the number of the predecessor blocks, appending a compensation code for the wait instruction to one or more predecessors that lack the wait instruction;
removing the wait instruction from the predecessors; and
prepending an instruction instance of the wait instruction to the successor block.

13. A computer system, comprising: a processor, a compiler, comprising:
an intermediate language unit to define an asynchronous signal in each memory access instruction in a program to represent a latency of the memory access instruction and to generate a wait instruction that uses each asynchronous signal;
a code motion on a first set of one or more instructions unit to perform a first code motion in the program except each memory access instruction in the program subject to a dependence constraint of the program and to perform a second code motion on a second set of one or more instructions in the program except each wait instruction in the program subject to a dependence constraint of the program to hide a latency of the memory access instruction in the program and to increase a number of instructions between issue and completion of the memory access instruction, wherein the first code motion and the second code motion are in opposite directions.

14. The compiler of claim 13, wherein the intermediate language unit further to:
define a pseudo signal in the wait instruction associated with the memory access instruction and to make an instruction in the program that depends on the memory access instruction use the pseudo signal.

15. The compiler of claim 13, wherein the first code motion comprises moving the wait instruction associated with the memory access instruction and a first set of one or more instructions in a first direction subject to the dependent constraint, with the memory access instruction fixed; and
the second code motion comprises moving the memory access instruction and a second set of one or more instructions in the program subject to the dependent constraint in a second direction that is opposite to the first direction, with the wait instruction fixed.

16. The compiler of claim 13, wherein
the first code motion comprises sinking the wait instruction associated with the memory access instruction and a first set of one or more instructions of the program from each predecessor block to a successor block at a merging point of the predecessor blocks subject to the dependence constraint of the program, in response to determining that each predecessor block comprises the wait instruction and the one or more instructions, with the memory access instruction fixed; and
the second code motion comprises hoisting the memory access instruction and a second set of one or more instructions in the program subject to the dependent constraint, with the wait instruction fixed.

17. The compiler of claim 13, wherein the code motion unit further to
perform a speculative code motion on the wait instruction associated with the memory access instruction, in response to determining that the wait instruction is present in a first predecessor block of a merging successor block of the program and is absent in a second predecessor block of the merging successor block.

18. The compiler of claim 13, wherein the code motion unit further to
recognize the wait instruction associated with the memory access instruction as a motion candidate subject to a dependence constraint of the program;
in response to determining that the wait instruction is present in a first predecessor block of the merging successor block and is absent in a second predecessor block of the merging successor block, insert a compensation code for the wait instruction into the second predecessor block; and
sink the wait instruction into a merging successor block of the first and second predecessor blocks subject to the dependence constraint.

19. The compiler of claim 18, wherein the code motion unit further to hoist the memory access instruction subject to the dependence constraint.

20. A tangible machine readable storage medium comprising a plurality of instructions that in response to being executed result in a computing device extracting an asynchronous signal from each memory access instruction in a program to represent a latency of the memory access instruction;
generating a wait instruction to wait for each asynchronous signal;
performing a first code motion on a first set of one or more instructions in the program except each memory access instruction in the program subject to a dependence constraint of the program; and
performing a second code motion on a second set of one or more instructions in the program except each wait instruction in the program subject to a dependence constraint of the program, to increase a number of instructions between issue and completion of the memory access instruction, wherein the first code motion and the second code motion are in opposite directions.

21. The tangible machine readable storage medium of claim 18, wherein the machine readable storage medium further comprising instructions that in response to being executed result in the computing device enforcing a first dependence between the memory access instruction and the wait instruction via the asynchronous signal.

22. The tangible machine readable storage medium of claim 20, wherein the machine readable storage medium further comprising instructions that in response to being executed result in the computing device introducing a pseudo signal to enforce a second dependence between the wait instruction and a memory access dependent instruction.

23. The tangible machine readable storage medium of claim 20, wherein the machine readable storage medium further comprising instructions that in response to being executed result in the computing device making the memory access instruction define the asynchronous signal; and making the wait instruction use the asynchronous signal.

24. The tangible machine readable storage medium of claim 18, wherein the machine readable storage medium further comprising instructions that in response to being executed result in the computing device making the wait instruction define a pseudo signal; and making an instruction that depends on the completion of the memory access instruction use the pseudo signal.

25. The tangible machine readable storage medium of claim 20, wherein the machine readable storage medium further comprising instructions that in response to being executed result in the computing device storing the asynchronous signal in a signal register of a network device.

* * * * *

UNITED STATES PATENT AND TRADEMARK OFFICE
CERTIFICATE OF CORRECTION

| | | |
|---|---|---|
| PATENT NO. | : 7,752,611 B2 | Page 1 of 1 |
| APPLICATION NO. | : 10/582519 | |
| DATED | : July 6, 2010 | |
| INVENTOR(S) | : Li et al. | |

It is certified that error appears in the above-identified patent and that said Letters Patent is hereby corrected as shown below:

In column 11, at line 36 delete, "a code motion on a first set of one or more instructions unit to perform a first code motion" and insert --a code motion unit to perform a first code motion on a first set of one or more instructions--.

Signed and Sealed this
Twenty-ninth Day of March, 2011

David J. Kappos
*Director of the United States Patent and Trademark Office*